(12) United States Patent
Lee et al.

(10) Patent No.: US 10,029,446 B2
(45) Date of Patent: Jul. 24, 2018

(54) FLEXIBLE DISPLAY DEVICE

(71) Applicant: SAMSUNG DISPLAY CO., LTD., Yongin-Si, Gyeonggi-Do (KR)

(72) Inventors: Jihwa Lee, Suwon-si (KR); Jinkyu Kim, Cheongju-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 47 days.

(21) Appl. No.: 15/172,006

(22) Filed: Jun. 2, 2016

(65) Prior Publication Data
US 2017/0066221 A1    Mar. 9, 2017

(30) Foreign Application Priority Data

Sep. 4, 2015    (KR) .......................... 10-2015-0125581

(51) Int. Cl.
    *B32B 7/12*      (2006.01)

(52) U.S. Cl.
    CPC ............ *B32B 7/12* (2013.01); *B32B 2307/42* (2013.01); *B32B 2307/50* (2013.01); *B32B 2307/51* (2013.01); *B32B 2457/20* (2013.01); *B32B 2571/00* (2013.01)

(58) Field of Classification Search
CPC ... B32B 7/12; B32B 2571/00; B32B 2307/42; B32B 2307/51; B32B 2457/20; B32B 2307/50
See application file for complete search history.

(56) References Cited

U.S. PATENT DOCUMENTS

| | | | |
|---|---|---|---|
| 3,691,140 A | 9/1972 | Silver | |
| 3,857,731 A | 12/1974 | Merrill, Jr. et al. | |
| 6,630,218 B1 * | 10/2003 | Abe ...................... | C09J 7/0207 |
| | | | 428/143 |

(Continued)

FOREIGN PATENT DOCUMENTS

| | | |
|---|---|---|
| JP | 2004-319659 A | 11/2004 |
| JP | 4034866 B2 | 11/2007 |

(Continued)

OTHER PUBLICATIONS

Japanese Patent Abstract for JPH 11209704 A, which corresponds to JP Publication No. 4034866 B2, published Nov. 2, 2007, 1 page.

(Continued)

*Primary Examiner* — Nathan L Van Sell
(74) *Attorney, Agent, or Firm* — Lewis Roca Rothgerber Christie LLP

(57) ABSTRACT

A flexible display device including a first flexible member including a bending part and a non-bending part, a window on a top surface or a bottom surface of the first flexible member, and a first adhesive member between the first flexible member and the window, and including a first adhesive part overlapping the bending part, a second adhesive part overlapping the non-bending part, a first adhesive material, and a plurality of first non-adhesive elastic materials dispersed in the first adhesive material, wherein at least one of the first non-adhesive elastic materials may be partially exposed on at least one of the top surface or the bottom surface of the first adhesive member.

20 Claims, 20 Drawing Sheets

(56) References Cited

U.S. PATENT DOCUMENTS

| | | | |
|---|---|---|---|
| 2012/0123016 A1* | 5/2012 | Bolte | C09J 171/02 523/122 |
| 2012/0222805 A1* | 9/2012 | Shintani | C09J 7/0289 156/240 |
| 2012/0223455 A1* | 9/2012 | Shintani | H01L 51/003 264/234 |
| 2014/0044957 A1* | 2/2014 | Hirayama | H01L 23/293 428/327 |
| 2014/0295150 A1* | 10/2014 | Bower | C09J 7/02 428/201 |
| 2015/0147532 A1* | 5/2015 | Nam | G02B 26/005 428/172 |
| 2015/0210588 A1* | 7/2015 | Chang | C03C 21/002 361/750 |
| 2015/0210589 A1* | 7/2015 | Chang | C03C 21/002 428/220 |
| 2015/0210590 A1* | 7/2015 | Chang | C03C 21/002 428/220 |
| 2015/0227018 A1* | 8/2015 | Paolini, Jr. | C08J 7/16 156/275.5 |

FOREIGN PATENT DOCUMENTS

| | | |
|---|---|---|
| KR | 10-0411188 B1 | 12/2003 |
| KR | 10-2006-0052686 A | 5/2006 |
| KR | 10-2011-0091531 A | 8/2011 |
| KR | 10-2011-0099756 A | 9/2011 |
| KR | 10-1345484 B1 | 12/2013 |
| KR | 10-2014-0055685 A | 5/2014 |
| KR | 10-2014-0063227 A | 5/2014 |

OTHER PUBLICATIONS

Korean Patent Abstract for KR 2002-0031533 A, which corresponds to KR Publication No. 10-0411188 B1, published Dec. 18, 2003, 1 page.

Korean Patent Abstract for KR 2009-0077037 A, which corresponds to KR Publication No. 10-1345484 B1, published Dec. 27, 2013, 1 page.

* cited by examiner

FLEXIBLE DISPLAY DEVICE

CROSS-REFERENCE TO RELATED APPLICATION

This application claims priority to, and the benefit of, Korean Patent Application No. 10-2015-0125581, filed on Sep. 4, 2015, the entire contents of which are incorporated herein by reference in their entirety.

BACKGROUND

1. Field

The present disclosure herein relates to a flexible display device.

2. Description of the Related Art

A display device displays various images on a display screen, thereby providing information to a user. Recently, display devices that are capable of bending have been developed. A flexible display device, unlike a flat display device, may be folded, rolled up, or bent like paper. Flexible devices whose shapes are capable of being changed in various ways may be easily carried, and may improve the convenience of users.

SUMMARY

The present disclosure provides a flexible display device in which a failure rate is reduced.

The present disclosure also provides a flexible display device in which a limitation of separation between elements, which is caused by bending, is reduced or minimized.

An embodiment of the present disclosure provides a flexible display device including a first flexible member including a bending part and a non-bending part, a window on a top surface or a bottom surface of the first flexible member, and a first adhesive member between the first flexible member and the window, and including a first adhesive part overlapping the bending part, a second adhesive part overlapping the non-bending part, a first adhesive material, and a plurality of first non-adhesive elastic materials dispersed in the first adhesive material, wherein at least one of the first non-adhesive elastic materials may be partially exposed on at least one of the top surface or the bottom surface of the first adhesive member.

The first adhesive material may include an adhesive polymer, and the first non-adhesive elastic materials may include elastic microspheres.

The flexible display device may be configured to operate either in a first mode, in which at least a portion of the bending part and the first adhesive part may undergo bending, or in a second mode, in which the bending part and the first adhesive part may be substantially straightened.

The average height of the first non-adhesive elastic materials in the first adhesive part in the first mode may be lower than an average height of the first non-adhesive elastic materials in the first adhesive part in the second mode, the average height of the first non-adhesive elastic materials being defined as an average value of the maximum height of each of the first non-adhesive elastic materials.

The average height of the first non-adhesive elastic materials in the first adhesive part in the first mode may be lower than an average height of the first non-adhesive elastic materials in the second adhesive part in the first mode, the average height of the first non-adhesive elastic materials being defined as an average value of the maximum height of each of the first non-adhesive elastic materials.

The adhesive strength of the first adhesive part in the first mode may be configured to be greater than an adhesive strength of the first adhesive part in the second mode.

The adhesive strength per unit area of the first adhesive part in the first mode may be greater than an adhesive strength per unit area of the second adhesive part in the first mode.

The adhesive area of the first adhesive part in the first mode may be greater than an adhesive area of the first adhesive part in the second mode, the adhesive areas including an exposed area of the first adhesive material at the top surface or the bottom surface of the first adhesive member.

The adhesive area per unit area of the first adhesive part in the first mode may be greater than an adhesive area per unit area of the second adhesive part in the first mode, the adhesive areas including an area at which the first adhesive material may be exposed.

The first flexible member may include at least one of a polarizing plate, a display panel, or a touchscreen panel.

The flexible display may further include a second flexible member on the top surface or the bottom surface of the first flexible member opposite the window, and a second adhesive member between the first flexible member and the second flexible member, and including a third adhesive part overlapping the bending part, a fourth adhesive part overlapping the non-bending part, a second adhesive material, and a plurality of second non-adhesive elastic materials dispersed in the second adhesive material, wherein at least one of the second non-adhesive elastic materials may be partially exposed at a top surface of the second adhesive member or at a bottom surface of the second adhesive member.

The second adhesive material may include an adhesive polymer, and the second non-adhesive elastic materials may include elastic microspheres.

The flexible display device may be configured to operate either in a first mode, in which at least a portion of the bending part, the first adhesive part, and the third adhesive part may undergo bending, or in a second mode in which the bending part, the first adhesive part, and the third adhesive part may be substantially straightened.

The average height of the second non-adhesive elastic materials in the third adhesive part in the first mode may be lower than an average height of the second non-adhesive elastic materials in the third adhesive part in the second mode, the average height of the second non-adhesive elastic materials being defined as an average value of the maximum height of each of the second non-adhesive elastic materials.

The average height of the second non-adhesive elastic materials in the third adhesive part in the first mode may be lower than an average height of the second non-adhesive elastic materials in the fourth adhesive part in the first mode, the average height of the second non-adhesive elastic materials being defined as an average value of the maximum height of each of the second non-adhesive elastic materials.

The adhesive strength of the third adhesive part in the first mode may be greater than an adhesive strength of the third adhesive part in the second mode.

The adhesive strength per unit area of the third adhesive part in the first mode may be greater than an adhesive strength per unit area of the fourth adhesive part in the first mode.

The adhesive area of the third adhesive part in the first mode may be greater than an adhesive area of the third adhesive part in the second mode, the adhesive areas including an exposed area of the second adhesive material at the top surface or the bottom surface of the second adhesive member.

The adhesive area per unit area of the third adhesive part in the first mode may be greater than an adhesive area per unit area of the fourth adhesive part in the first mode, the adhesive areas including areas at which the second adhesive material may be exposed.

The second flexible member may include at least one of a polarizing plate or a protective member.

BRIEF DESCRIPTION OF THE DRAWINGS

The accompanying drawings are included to provide a further understanding of the present disclosure, and are incorporated in, and constitute a part of, this specification. The drawings illustrate exemplary embodiments of the present disclosure and, together with the description, serve to explain principles of the present disclosure. In the drawings.

DETAILED DESCRIPTION

Figure 1:
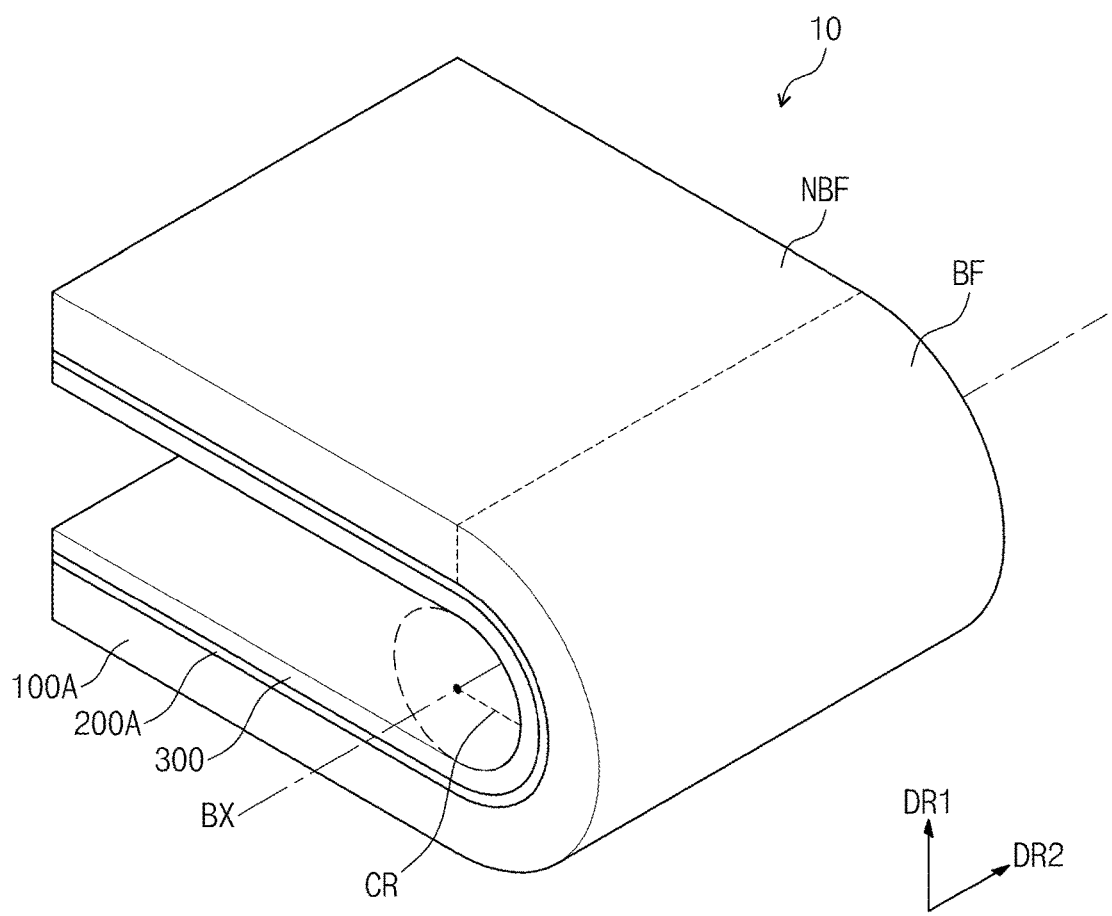
FIG. 1 is a schematic perspective view of a flexible display device in a bent state according to an embodiment of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein. Hereinafter, description will be given of a flexible display device according to an embodiment of the present disclosure.

Figure 2:
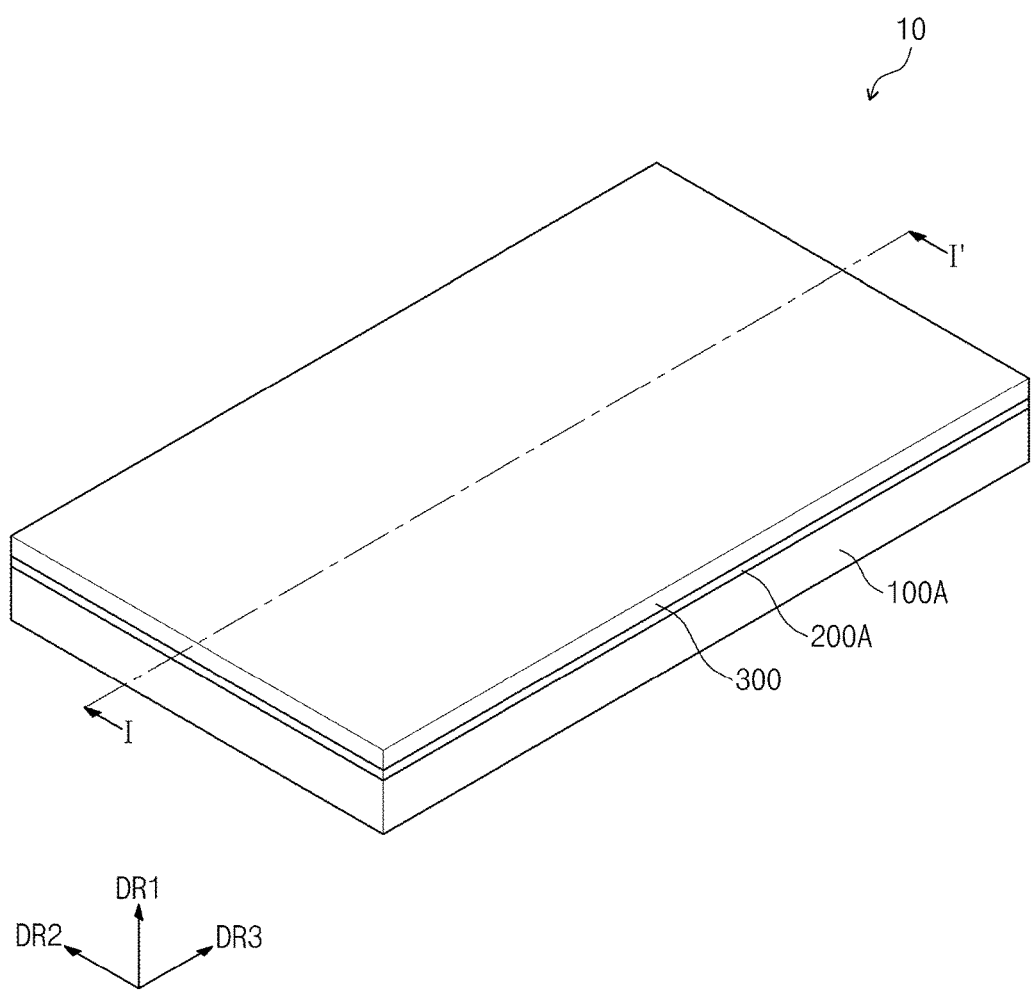
FIG. 2 is a schematic perspective view of a flexible display device in a straightened state according to an embodiment of the present disclosure.

FIG. 1 is a schematic perspective view of a flexible display device in a bent state according to an embodiment of the present disclosure, and FIG. 2 is a schematic perspective view of the flexible display device in a straightened state according to an embodiment of the present disclosure.

Referring to FIGS. 1 and 2, the flexible display device 10 according to an embodiment of the present disclosure includes a first flexible member 100A, a first adhesive member 200A, and a window 300, which are laminated sequentially in a first direction DR1. For the purposes of the present application, "flexible" indicates a property of being bendable, and includes everything from a completely foldable structure to a structure that may be bent on a degree of several nanometers.

The first flexible member 100A may include at least one of a polarizing plate, a display panel, or a touchscreen panel. When the first flexible member 100A includes the display panel, the display panel includes a flexible substrate. The display panel displays images on a surface. Specifically, the display panel generates images without distinguishing a bending part BF and a non-bending part NBF, which are described below.

Any polarizing plate, display panel, or touchscreen panel may be selected and used without limitation.

When the first flexible member 100A includes the display panel and the touchscreen panel, the first flexible member 100A may be a structure in which the touchscreen panel is directly laminated on the display panel, or may be a structure in which the display panel and touchscreen are interconnected through an adhesive member. The detailed description of the first adhesive member 200A below may be applied to the adhesive member.

The window 300 may have a function of protecting the first flexible member 100A. The window 300 may be selected and used without limitation. As a non-limiting example, a plastic window having flexibility may be used for application in the flexible display device. As another non-limiting example, the window 300 may include a structure in which a flexible polymer layer is disposed on a surface of a glass substrate.

The window 300 may further include a functional coating layer, such as an anti-fingerprint coating layer or an anti-reflective coating layer, and may also further include a protective member. The protective member may include a flexible plastic substrate or a plastic film. As a non-limiting example, the anti-fingerprint coating layer, the anti-reflective coating layer, or the protective member, may be selected and used. The first flexible member 100A and the window 300 are connected to each other by the first adhesive member 200A, which may be between the first flexible member 100A and the window 300.

The flexible display device 10 according to an embodiment of the present disclosure may operate in a first mode or in a second mode. The first flexible member 100A may include the bending part BF and the non-bending part NBF. The bending part BF is a part that may, in the first mode, undergo bending with respect to a bending axis BX that may extend in a second direction DR2, and the bending part BF may be straightened in the second mode. The bending part BF may be connected to the non-bending part NBF. The first flexible member 100A is an integrated type, in which the bending part BF and the non-bending part NBF may be interconnected. The non-bending part NBF might not undergo bending in either the first mode or the second mode. The non-bending part NBF may be flat, or may be slightly bent, in each of the first and second modes.

There may be a plurality of the non-bending parts NBF. As a non-limiting example, there may be two non-bending parts NBF. The bending part BF may be between two of the non-bending parts NBF with respect to a third direction DR3.

The flexible display device 10 according to an embodiment of the present disclosure may, in the first mode, be completely folded such that two of the non-bending parts NBF face each other. The flexible display device 10 according to an embodiment of the present disclosure may, in the first mode, have a radius of curvature CR of about 0.5 mm to about 20 mm, may have the radius of curvature CR of about 3 mm to about 20 mm, or may have the radius of curvature CR of about 1 mm to about 10 mm. Although the display device 10 is exemplarily illustrated such that a distance between two of the non-bending parts NBF is uniform with respect to the bending axis BX, the display device 10 is not limited thereto, and the distance between two of the non-bending parts NBF that are facing each other may be non-uniform. In addition, when the flexible display device 10 is bent with respect to the bending axis BX, the two non-bending parts NBF, which face each other due to the bending, may be illustrated as having the same surface area as each other. Embodiments of the present disclosure are not limited thereto, and surface areas of two of the non-bending parts NBF that face each other may also differ from each other.

For the purposes of the present application, "bending" may refer to elements that are included in the flexible display device being bent into certain shapes by an external force.

The first mode may include a first bending mode and a second bending mode. The flexible display device 10 according to an embodiment of the present disclosure may be bent in any one direction with respect to the bending axis BX. The flexible display device 10 may be bent in the first bending mode such that the window 300 is facing toward the inner side, or flexible display device 10 may be bent in the first bending mode such that the first flexible member 100A is facing toward the inner side.

The flexible display device 10 according to an embodiment of the present disclosure may be bent in the second bending mode in the opposite direction to the bending direction of the first bending mode, with respect to the bending axis BX. The flexible display device 10 may be bent in the second bending mode such that the window 300 is facing toward the inner side. Conversely, the flexible display device 10 may be bent in the second bending mode such that the first flexible member 100A is facing toward the inner side.

Figure 3:
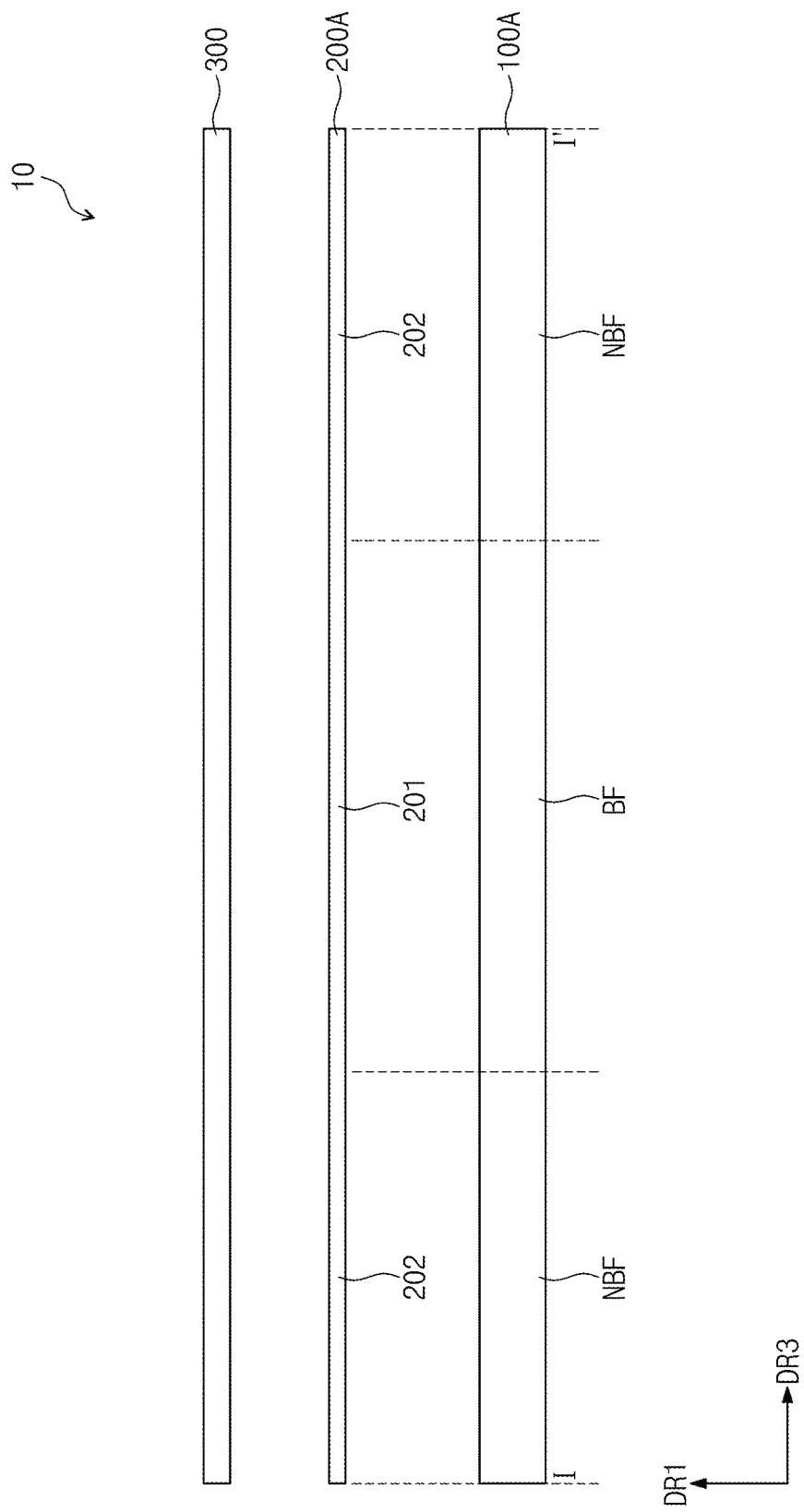
FIG. 3 is a schematic sectional view taken along the line I-I' in FIG. 2.

FIG. 3 is a schematic sectional view taken along the line I-I' in FIG. 2.

Referring to FIG. 3, the first adhesive member 200A is between the first flexible member 100A and the window 300. The first adhesive member 200A includes a first adhesive part 201 and a second adhesive part 202. In other embodiments, the first adhesive member 200A may be a plurality of the second adhesive parts 202 (e.g., there may be two second adhesive parts 202). The first adhesive part 201 may be between two of the second adhesive parts 202 with respect to the third direction DR3. The first adhesive part 201 and second adhesive part 202 may be interconnected, and the first adhesive member 200A may be an integrated type.

The first adhesive part 201 may overlap the bending part BF of the first flexible member 100A. The second adhesive part(s) 202 may overlap the non-bending part(s) NBF of the first flexible member 100A.

As described above, the flexible display device 10 according to an embodiment of the present disclosure may operate in the first mode or in the second mode. In the first mode, the flexible display device 10 may undergo bending, and in the second mode, the flexible display device 10 may be straightened. More specifically, the flexible display device 10 according to an embodiment of the present disclosure may operate in the first mode, in which at least a portion of the bending part BF of the first flexible member 100A and first adhesive part 201 of the first adhesive member 200A may undergo bending, or may operate in the second mode, in which the bending part BF is straightened. In the first mode, a portion of the window 300 that corresponds to the bending part BF of the first flexible member 100A, and the first adhesive part 201 of the first adhesive member 200A, may bend together.

Figure 4A:
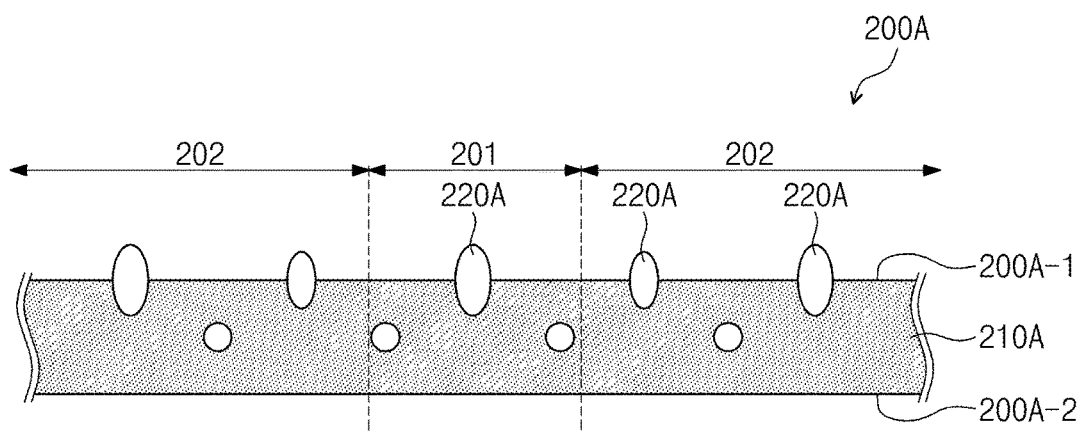
FIG. 4A is a sectional view illustrating, in greater detail, a first adhesive member in FIG. 2.
Figure 4B:
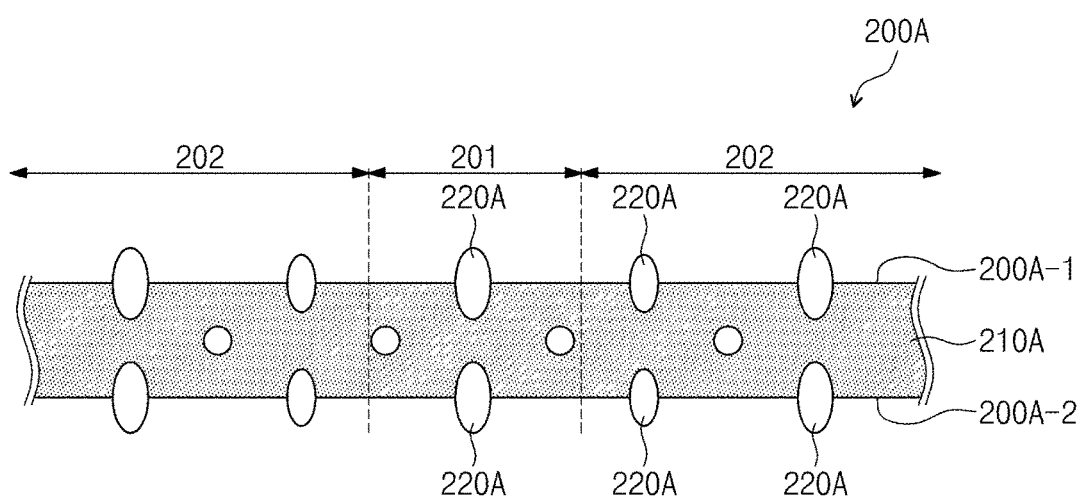
FIG. 4B is a sectional view illustrating, in greater detail, a first adhesive member in FIG. 2.

FIG. 4A is a sectional view illustrating, in greater detail, the first adhesive member in FIG. 2, and FIG. 4B is a sectional view illustrating, in greater detail, the first adhesive member in FIG. 2.

Referring to FIGS. 4A and 4B, the first adhesive member 200A includes a first adhesive material 210A and a plurality of first non-adhesive elastic materials 220A. The first non-adhesive elastic materials 220A may be included in the first adhesive material 210A. The first non-adhesive elastic materials 220A may be dispersed in the first adhesive material 210A. The first adhesive material 210A may be an element that allows the first adhesive member 200A to be adhesive, and the first non-adhesive elastic materials 220A may be non-adhesive.

At least one of the first non-adhesive elastic materials 220A may be partially exposed on at least one surface of (e.g., a top surface 200A-1 of, or a bottom surface 200A-2 of) the first adhesive member 200A. In other embodiments of the present invention, at least one of the first non-adhesive elastic materials 220A may be partially exposed on only the bottom surface 200A-2 of the first adhesive member 200A. A portion of the first non-adhesive elastic materials 220A may be completely contained inside the first adhesive material 210A, and thus might not be exposed on either of the top and bottom surfaces 200A-1, 200A-2 of the first adhesive member 200A.

The first adhesive material 210A may be, as a non-limiting example, an adhesive polymer. A material that is used as a typical adhesive may be selected and may be used without limitation as the adhesive polymer. Non-limiting examples of the adhesive polymer may include acrylic-based polymer, rubber-based polymer, silicone-based polymer, polyolefin, polyurethane, etc. The first adhesive material 210A may be, for example, a pressure-sensitive adhesive (PSA). The pressure-sensitive adhesive (PSA) may be selected and used without limitation.

The first non-adhesive elastic materials 220A may be, for example, elastic microspheres. The elastic microspheres may be used alone, or may be used by combining two or more elastic microspheres. The elastic microspheres may be selected and used without limitation. As a non-limiting example, the elastic microsphere may be inorganic or organic.

The particle diameter of the first non-adhesive elastic materials 220A may be, for example, about 10 nm to about 10 μm, about 10 nm to about 500 nm, about 10 nm to about 300 nm, or about 10 nm to about 100 nm. However, the particle diameter of the first non-adhesive elastic materials 220A is not limited thereto, and the particle diameter may correspond to the thickness of the first adhesive member 200A. For the purposes of the present application, "particle diameter" may indicate the "average particle diameter." Moreover, the average particle diameter may be measured by using a typical measurement method.

The weight ratio of the first non-adhesive elastic materials 220A that may be included in the first adhesive member 200A are not limited, but the first non-adhesive elastic materials 220A may be included, for example, at the weight ratio of about 5 to about 50, about 10 to about 45, or about 15 to about 40, to the total weight of 100 for the first adhesive member 200A. When the weight ratio of the first non-adhesive elastic materials 220A exceeds about 50 (e.g., exceeds about 50% of the total weight of the first adhesive member 200A), an adhesive strength of the first adhesive member 200A might not be realized, which is sufficiently capable of adhering the first flexible member 100A and the window 300. When the weight ratio of the first non-adhesive elastic materials 200A is below about 5 (e.g., when the weight of the first non-adhesive elastic materials 200A is below about 5% of the total weight of the first adhesive member 200A), there may be a diminished effect of adding the first non-adhesive elastic materials 200A may be inadequate.

Figure 5A:
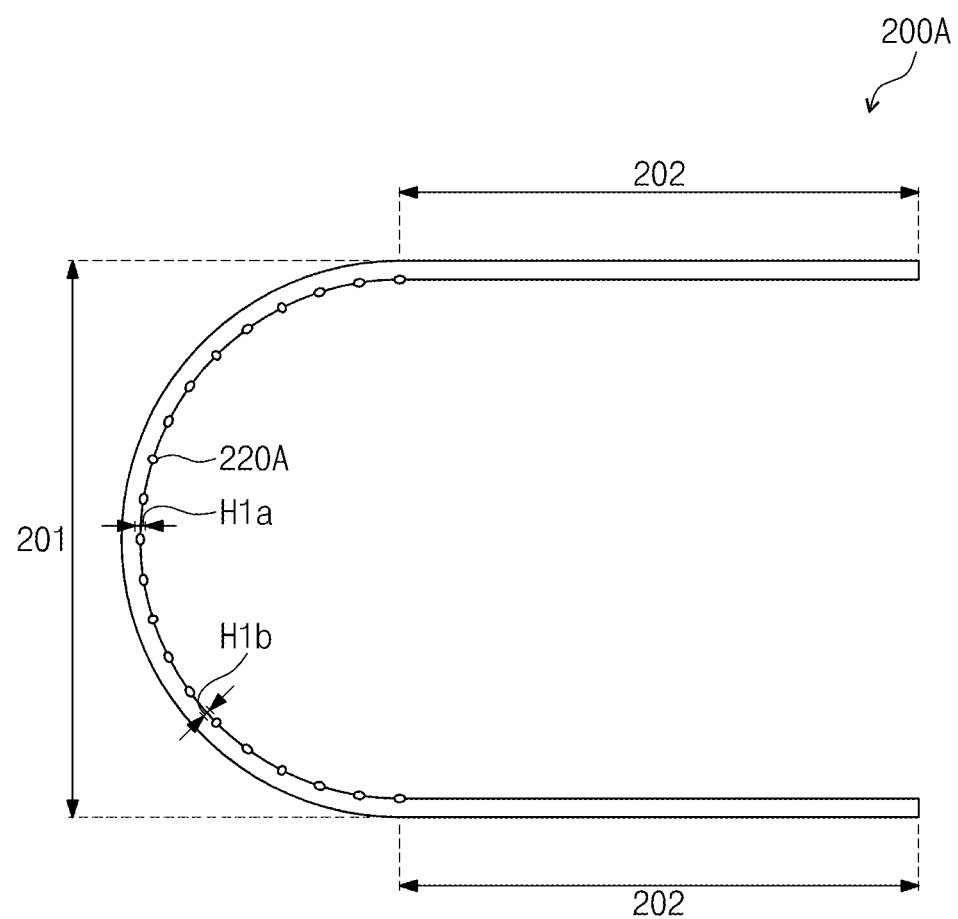
FIG. 5A is a schematic sectional view of a first adhesive member that is in a bent state.
Figure 5B:
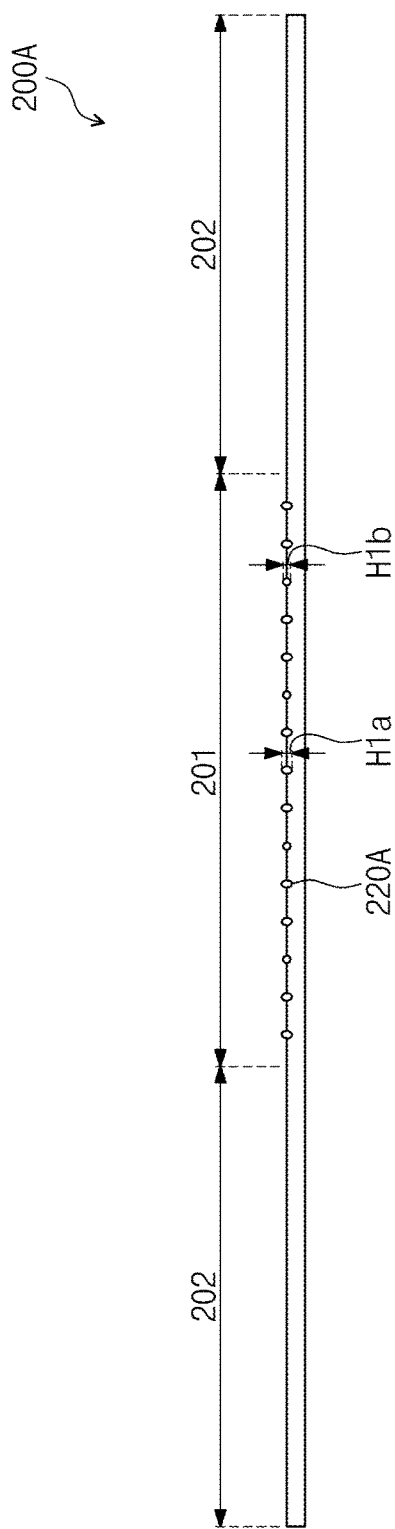
FIG. 5B is a schematic sectional view of a first adhesive member that is in a straightened state.

FIG. 5A is a schematic sectional view of the first adhesive member that is bent, and FIG. 5B is a schematic sectional view of the first adhesive member that is in a straightened state.

Referring to FIGS. 1, 5A, and 5B, the average height of the first non-adhesive elastic materials 220A (e.g., see FIGS. 4A and 4B) in the first adhesive part 201 during operation of the flexible display device 10 in the first mode may be lower than the average height of the first non-adhesive elastic materials 220A in the first adhesive part 201 during operation of the flexible display device 10 in the second mode. The first non-adhesive elastic materials 220A may have a plurality of heights, and a height that has the largest value among the plurality of heights is a maximum height (H1$a$, H1$b$, etc.). The average height of the first non-adhesive elastic materials 220A may be defined as an average value of the maximum height H1$a$ and H1$b$ of each of the first non-adhesive elastic materials 220A.

Because the first non-adhesive elastic materials 220A may be elastomers, the shape of the first non-adhesive elastic materials 220A may be deformed by a force that may be experienced due to bending of the flexible display device 10 in the first mode. As a non-limiting example, due to the force that is experienced from bending in the first mode, the first non-adhesive elastic materials 220A may have a smaller average value of the maximum height H1$a$ and H1$b$ in the first mode when compared to the second mode.

Figure 5C:
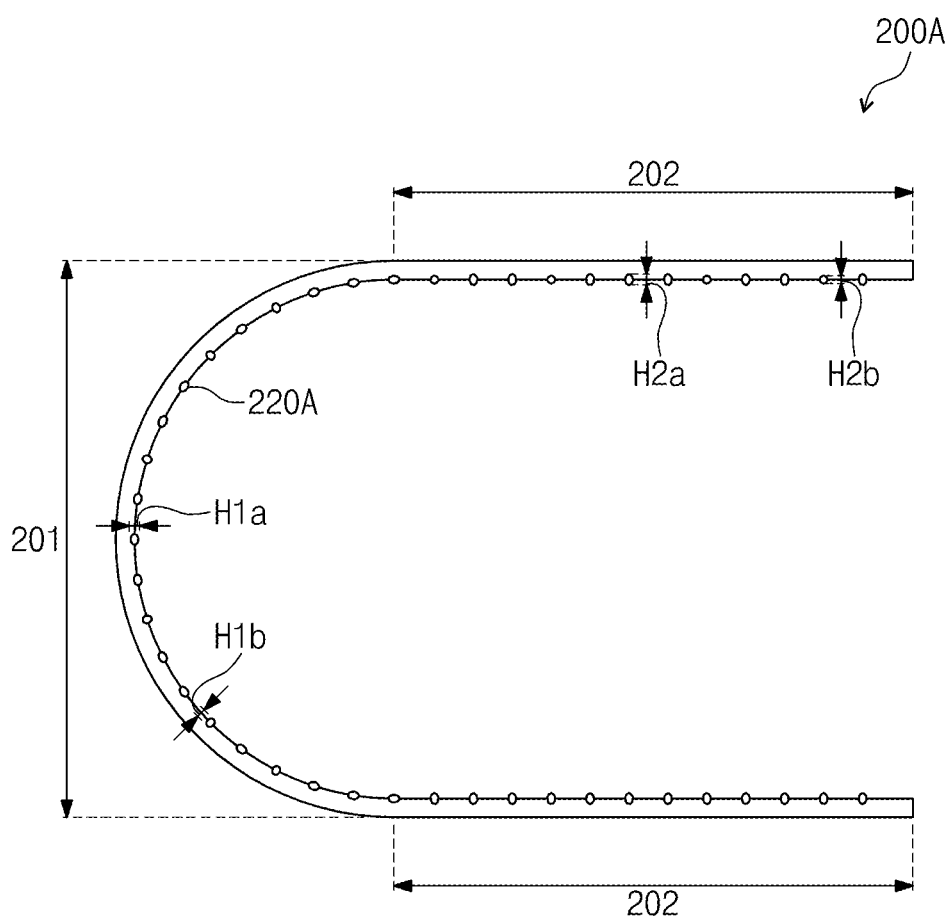
FIG. 5C is a schematic sectional view of a first adhesive member that is in a bent state.

FIG. 5C is a schematic sectional view of the first adhesive member in a bent state.

Referring to FIGS. 1 and 5C, during operation of the flexible display device 10 in the first mode, according to an embodiment of the present disclosure, an average height of the first non-adhesive elastic materials 220A in the first adhesive part 201 may be lower than an average height of the first non-adhesive elastic materials 220A in the second adhesive part 202. Each of the first non-adhesive elastic materials 220A may have a plurality of heights, and a height that may have the largest value among the plurality of heights is a maximum height (H1$a$, H1$b$, H2$a$, H2$b$, etc.). The average height of the first non-adhesive elastic materials 220A is defined the same as described above.

Because the first non-adhesive elastic materials 220A are elastomers, the shapes of the first non-adhesive elastic materials 220A in the first adhesive part 201 are deformed by a force that is experienced due to bending, but the first non-adhesive elastic materials 220A in the second adhesive part 202 do not experience the force due to bending, and thus, there may be little if any deformation of the shapes of the first non-adhesive elastic materials 220A in the second adhesive part 202.

Figure 6A:
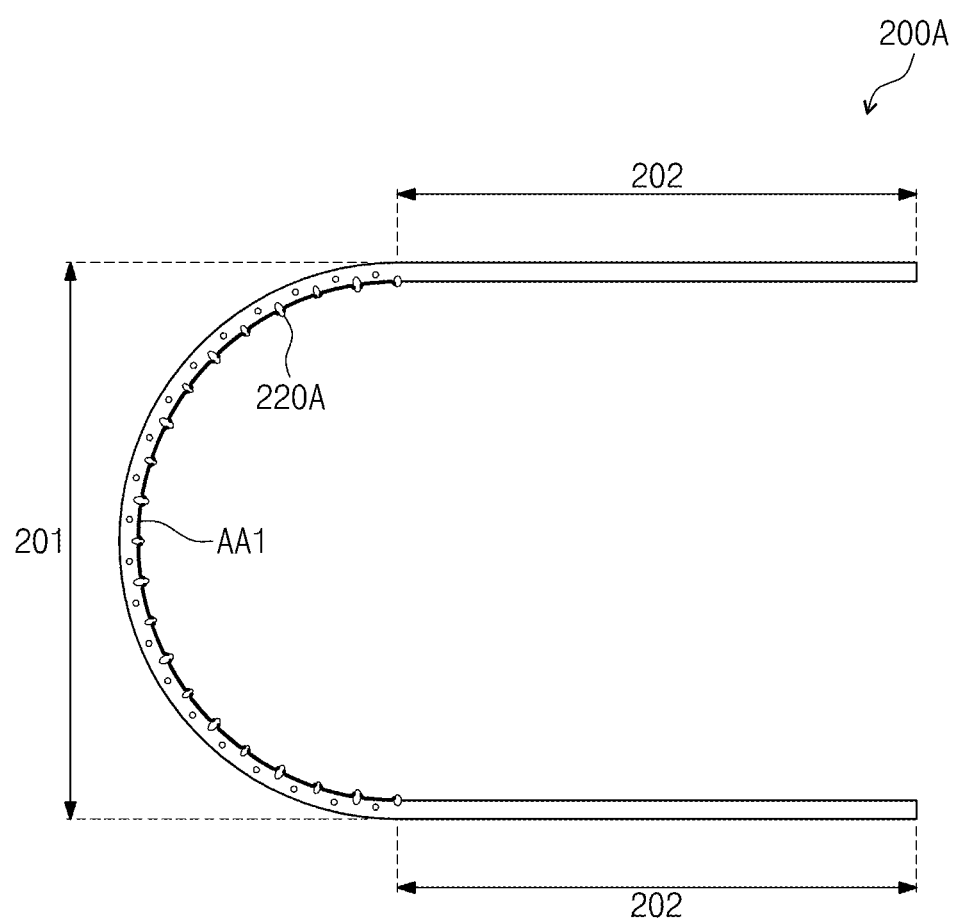
FIG. 6A is a schematic sectional view of a first adhesive member that is in a bent state.
Figure 6B:
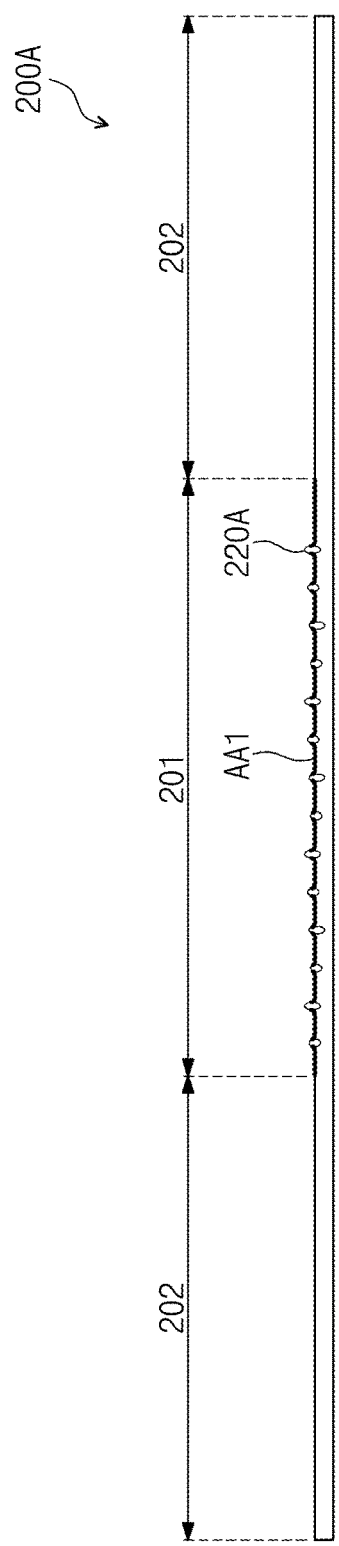
FIG. 6B is a schematic sectional view of a first adhesive member that is in a straightened state.

FIG. 6A is a schematic sectional view of the first adhesive member that is in a bent state, and FIG. 6B is a schematic sectional view of the first adhesive member that is in a straightened state.

Referring to FIGS. 1, 6A, and 6B, an adhesive area of the first adhesive part 201 during operation of the flexible display device 10 in the first mode, according to an embodiment of the present disclosure, may be greater than the adhesive area of the first adhesive part 201 during operation of the flexible display device 10 in the second mode. The adhesive area of the first adhesive part 201 may be defined as the total area of the first adhesive material 210A exposed on the top and bottom surfaces 200A-1, 200A-2 of the first adhesive member 200A (e.g., see FIGS. 4A and 4B). As a non-limiting example, in FIGS. 6A and 6B, in the first adhesive part 201, the adhesive area of a surface in which the first non-adhesive elastic materials 220A are unexposed may be the same in mode 1 and mode 2, or conversely, the adhesive area of a surface in which the first non-adhesive elastic materials 220A are exposed in mode 1 may be different than in mode 2. More specifically, an adhesive area AA1 of a surface in FIG. 6A, which illustrates the first mode in which the first non-adhesive elastic materials 220A are exposed, may be greater than the adhesive area AA1 of a surface in FIG. 6B, which may illustrate the second mode in which the first non-adhesive elastic materials 220A are exposed. Consequently, the adhesive area of the first adhesive part 201 when the flexible display device 10 operates in the first mode may be larger than the adhesive area of the first adhesive part 201 when the flexible display device 10 operates in the second mode.

Because, the adhesive area of the first adhesive part 201 in the first mode may be greater than the adhesive area of the first adhesive part 201 in the second mode, an adhesive strength of the first adhesive part 201 in the first mode may be greater than an adhesive strength of the first adhesive part 201 in the second mode.

In FIGS. 6A and 6B, the first non-adhesive elastic materials 220A is illustrated as being partially exposed on one surface of the first adhesive part 201, although the present disclosure is not limited thereto and, as a non-limiting example, the first non-adhesive elastic materials 220A may also be partially exposed on only the other surface of the first adhesive part 201. In addition, the first non-adhesive elastic materials 220A may be partially exposed on either or both of the one surface and the other surface of the first adhesive part 201.

Because the first non-adhesive elastic materials 220A may be elastomers, shapes thereof may be deformed when pressed by a force that is experienced due to bending of the flexible display device 10 in the first mode, and due to such shape deformation, an area in which the first non-adhesive elastic materials 220A are exposed on a surface of the first adhesive member 200A may be decreased. Consequently, as the shapes of the first non-adhesive elastic materials 220A change in the first mode, an area in which the first adhesive material 210A is exposed on the top surface 200A-1 of the first adhesive member 200A and on bottom surface 200A-2 of the first adhesive member 200A may be increased.

Figure 6C:
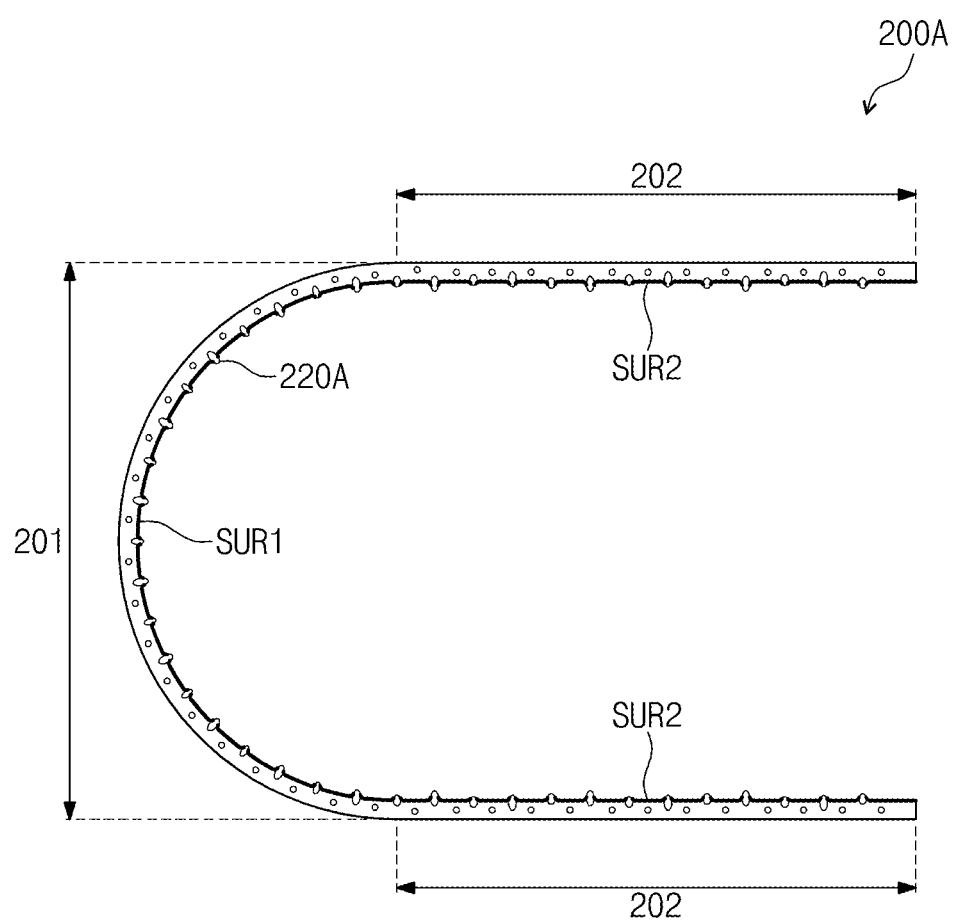
FIG. 6C is a schematic sectional view of a first adhesive member that is in a bent state.

FIG. 6C is a schematic sectional view of the first adhesive member that is bent.

Referring to FIGS. 1 and 6C, during operation of the flexible display device 10 in the first mode, according to an embodiment of the present disclosure, the adhesive area per 1 mm$^2$ unit area of the first adhesive part 201 may be greater than the adhesive area per 1 mm$^2$ unit area of the second adhesive part 202. The adhesive area per 1 mm$^2$ unit area of the first adhesive part 201 may be defined as an area per 1 mm$^2$ unit area in which the first adhesive material 210A is exposed. As a non-limiting example, the adhesive area per 1 mm$^2$ unit area of the surface in which the first non-adhesive elastic materials 220A are not exposed in the first adhesive part 201 in the first mode, and an adhesive area per 1 mm$^2$ unit area of the surface in which the first non-adhesive elastic materials 220A are not exposed in the second adhesive part 202 may be the same. However, the adhesive areas per 1 mm$^2$ unit of a surface SUR1 in which the first non-adhesive elastic materials 220A are exposed in the first adhesive part 201, and of a surface SUR2 in which the first non-adhesive elastic materials 220A are exposed in the second adhesive part 202, may be different. More specifically, the adhesive area per 1 mm$^2$ unit area of the surface SUR1 in which the first non-adhesive elastic materials 220A are exposed in the first adhesive part 201 may be greater than the adhesive area per 1 mm$^2$ unit area of the surface SUR2 in which the first non-adhesive elastic particles are exposed in the second adhesive part 202.

Because, in the first mode, the adhesive area per 1 mm$^2$ unit area of the first adhesive part 201 may be greater than the adhesive area per 1 mm$^2$ unit area of the second adhesive part 202, then the adhesive strength per 1 mm$^2$ unit area of the first adhesive part 201 may be greater than the adhesive strength per 1 mm$^2$ unit area of the second adhesive part 202.

In FIG. 6C, the first non-adhesive elastic materials 220A may be illustrated as only being partially exposed on one surface of the first adhesive part 201 and second adhesive part 202, although the present disclosure is not limited thereto and, as a non-limiting example, the first non-adhesive elastic materials 220A may also be partially exposed on only the other surface of the first adhesive part 201 and second adhesive part 202, and the first non-adhesive elastic materials 220A may also be partially exposed on both the one surface and the other surface of the first adhesive part 201 and second adhesive part 202.

When the stress experienced by the bending part BF during bending of the flexible display panel exceeds the adhesive strength between each of the elements, there may be a separation occurring between each of the elements. However, because the adhesive strength in the portion of the flexible display device, when being bent, may be increased when compared to a straightened state, the adhesive strength between each of the elements may be larger than the stress experienced by the portion that is being bent, and thus the occurrence of separation between each of the elements may be reduced or minimized.

When the adhesive strength in the portion of the flexible display device, when being bent, is increased when compared to a straightened state, but the increase in adhesive strength does not reach the level at which the adhesive strength between each of the elements is larger than the stress experienced by the portion that is being bent, separation may still occur. Even in this case, although the adhesive member loses adhesiveness due to damage to the adhesive member when separation occurs in a typical flexible display device, because the first adhesive member in the flexible display device according to an embodiment of the present disclosure includes the first non-adhesive elastic materials, due to the elasticity of the first non-adhesive elastic materials, the adhesive member might not be damaged even when separation occurs. Specifically, because separation may occur as the shapes of the first non-adhesive elastic materials 220A, which may be deformed by the force that was experienced due to bending of the first non-adhesive elastic materials 220A, are restored, the first adhesive member 200A might not be damaged even when separation occurs, and may be re-adhered after a temporary separation occurs.

Figure 7:
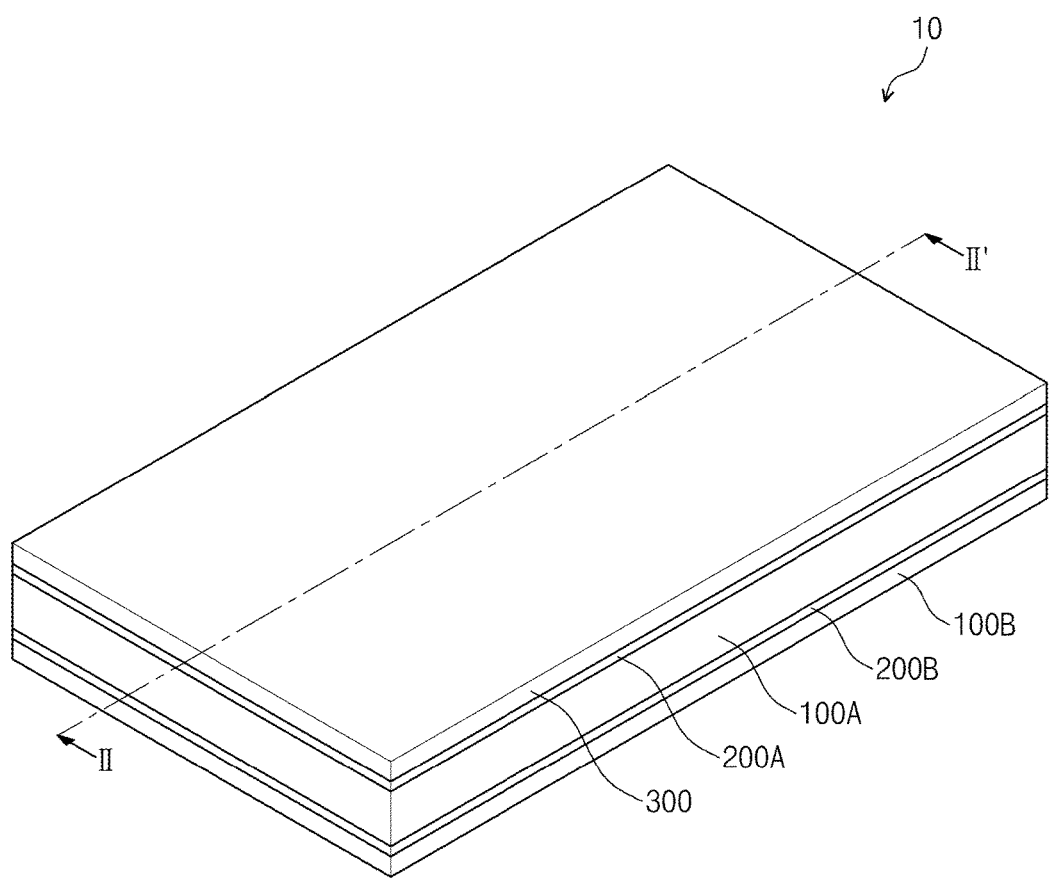
FIG. 7 is a schematic perspective view of a flexible display device that is straightened according to an embodiment of the present disclosure.
Figure 7:
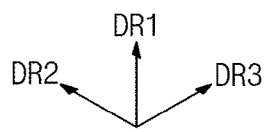

FIG. 7 is a schematic perspective view of the flexible display device according to an embodiment of the present disclosure which is straightened.

Referring to FIG. 7, the flexible display device 10 according to an embodiment of the present disclosure may further include a second flexible member 100B and a second adhesive member 200B.

The following description will emphasize differences between the flexible display device 10 of the present embodiment and the flexible display device 10 described above, and features that are not further described below follow the description of the flexible display device 10 according to the embodiment described above.

Unless otherwise noted, the description above regarding the first flexible member 100A may also correspond to the second flexible member 100B.

The second flexible member 100B may be disposed on the other surface of the first flexible member 100A, and may be disposed on the surface opposite the window 300.

The second flexible member 100B may include at least one of a polarizing plate or a protective member. However, elements that are included in the second flexible member 100B are not limited thereto. When the first flexible member 100A and second flexible member 100B each include the polarizing plate, the polarizing plate that is included in the first flexible member 100A, and the polarizing plate that is included in the second flexible member 100B, may be the same or different. When the first flexible member 100A and second flexible member 100B each include the protective member, the protective member that is included in the first flexible member 100A, and the protective member that is included in the second flexible member 100B, may be the same or different.

When the second flexible member includes a plurality of elements, each element may be a directly laminated structure, or a structure in which elements are connected through the adhesive member. Description given above of the first adhesive member 200A may be applied to the second adhesive member 200B.

Figure 8:
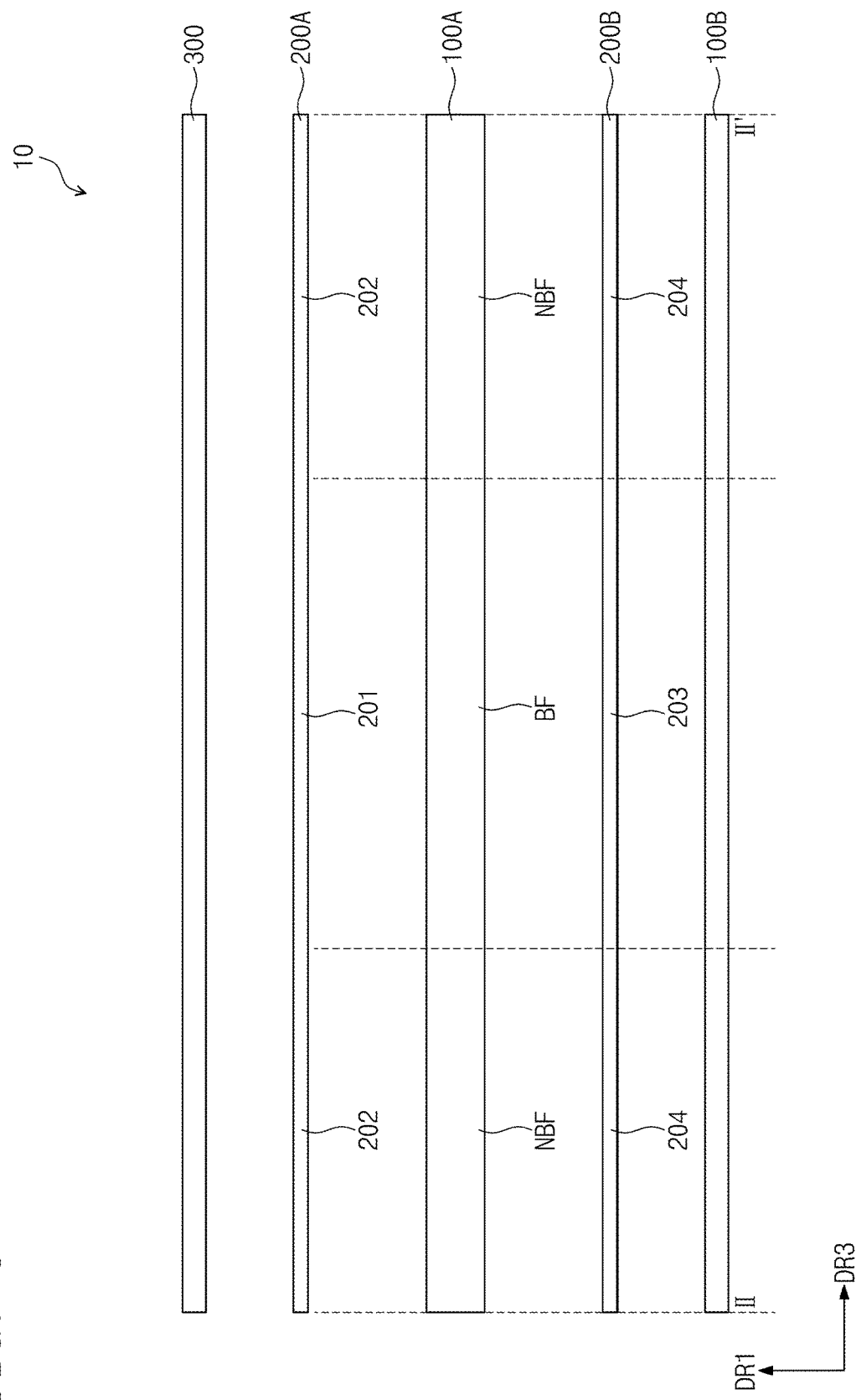
FIG. 8 is a schematic sectional view taken along the line II-II' in FIG. 7.
Figure 9:
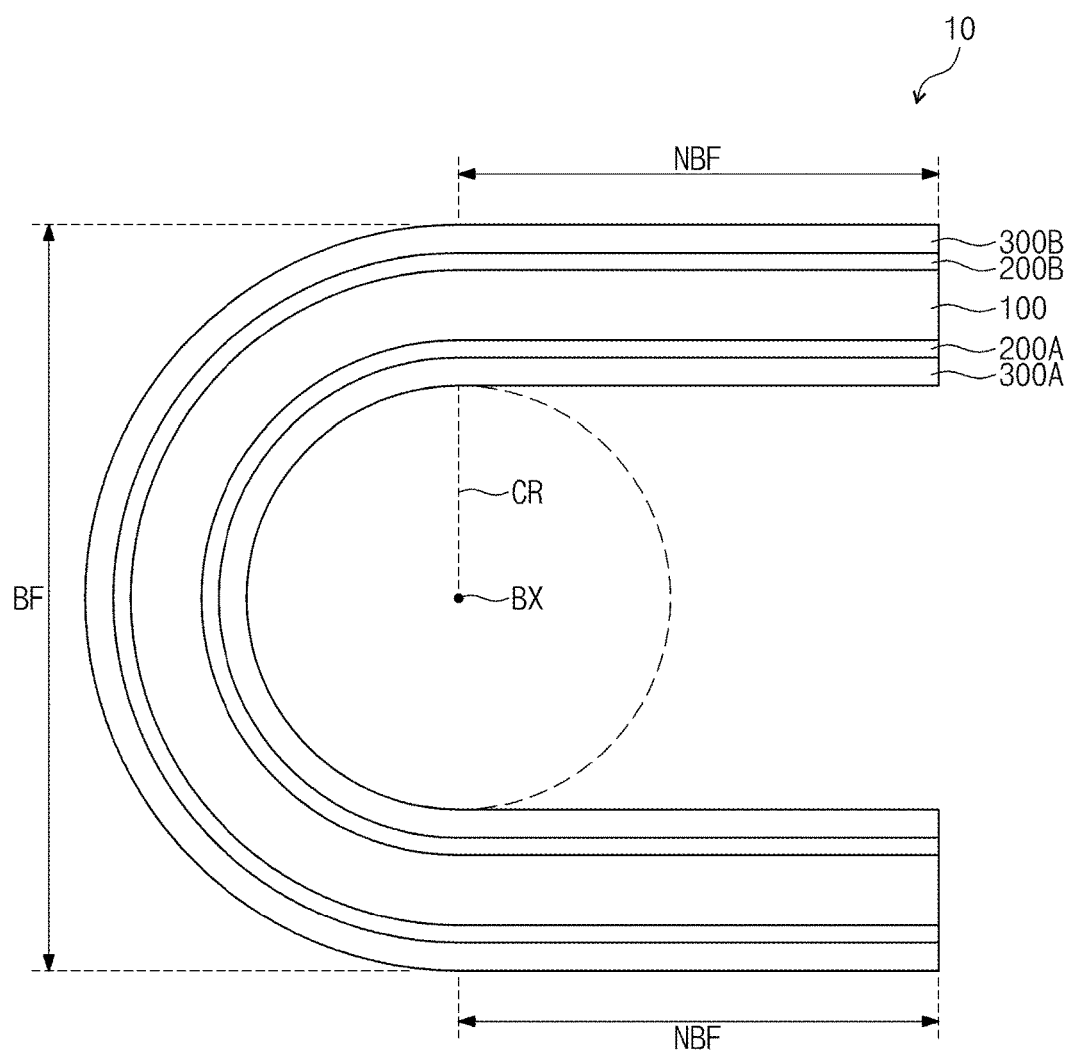
FIG. 9 is a schematic perspective view of a flexible display device that is bent according to an embodiment of the present disclosure.
Figure 10A:
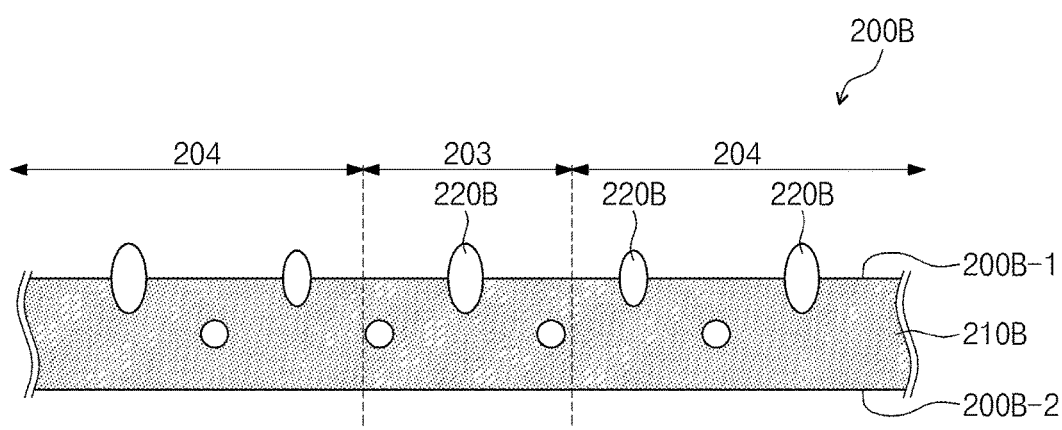
FIG. 10A is a sectional view illustrating in greater detail a second adhesive member in FIG. 8.
Figure 10B:
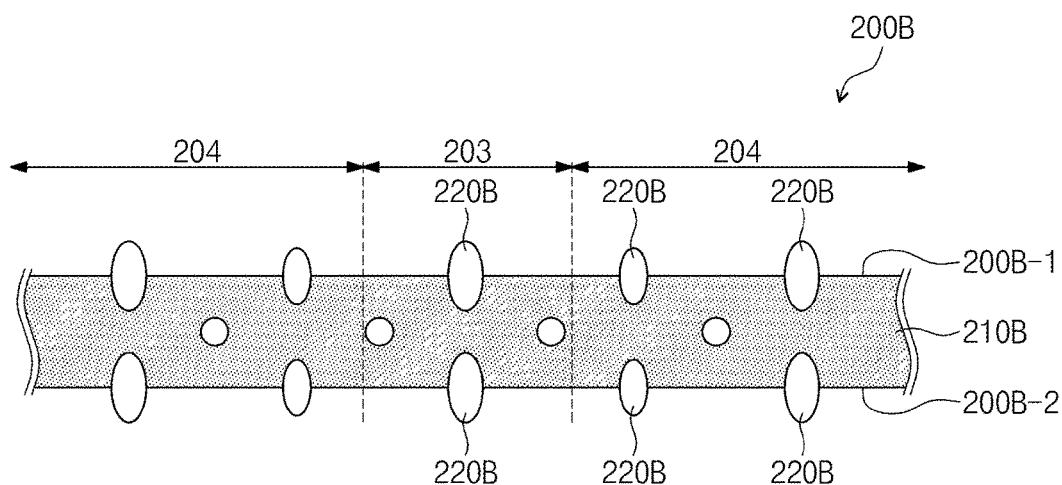
FIG. 10B is a sectional view illustrating in greater detail a second adhesive member in FIG. 8.
Figure 11A:
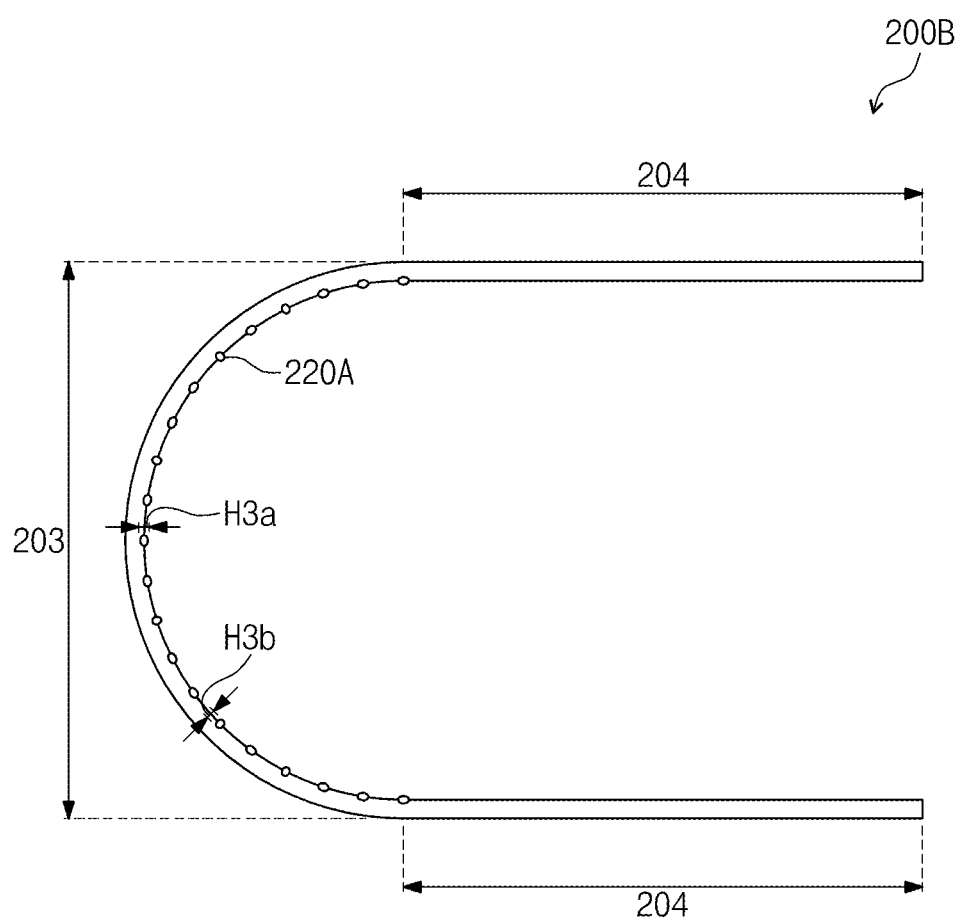
FIG. 11A is a schematic sectional view of a second adhesive member which is in a bent state.
Figure 11B:
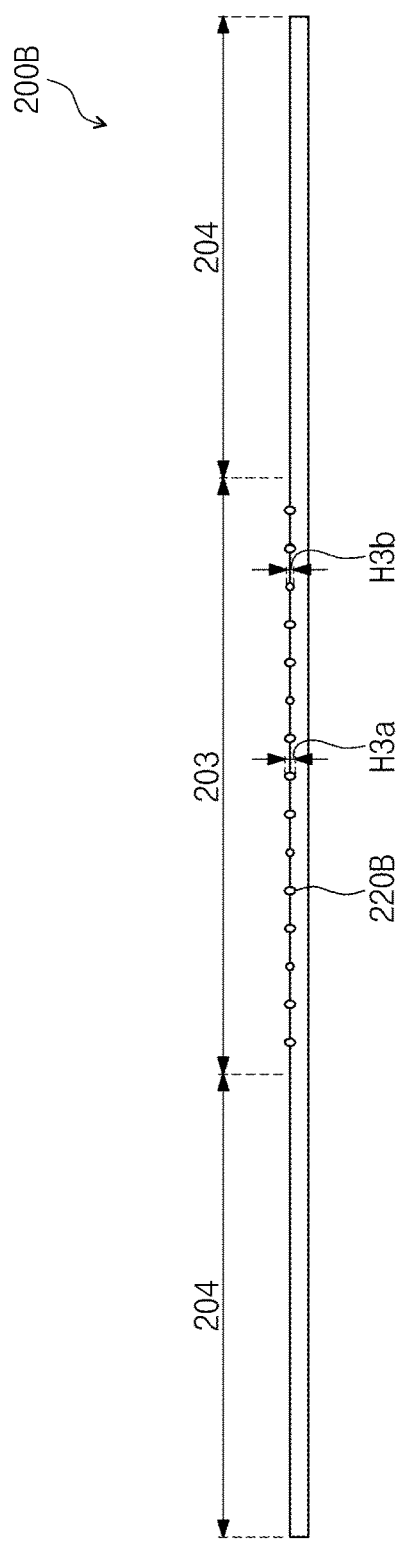
FIG. 11B is a schematic sectional view of a second adhesive member which is in a straightened state.
Figure 11C:
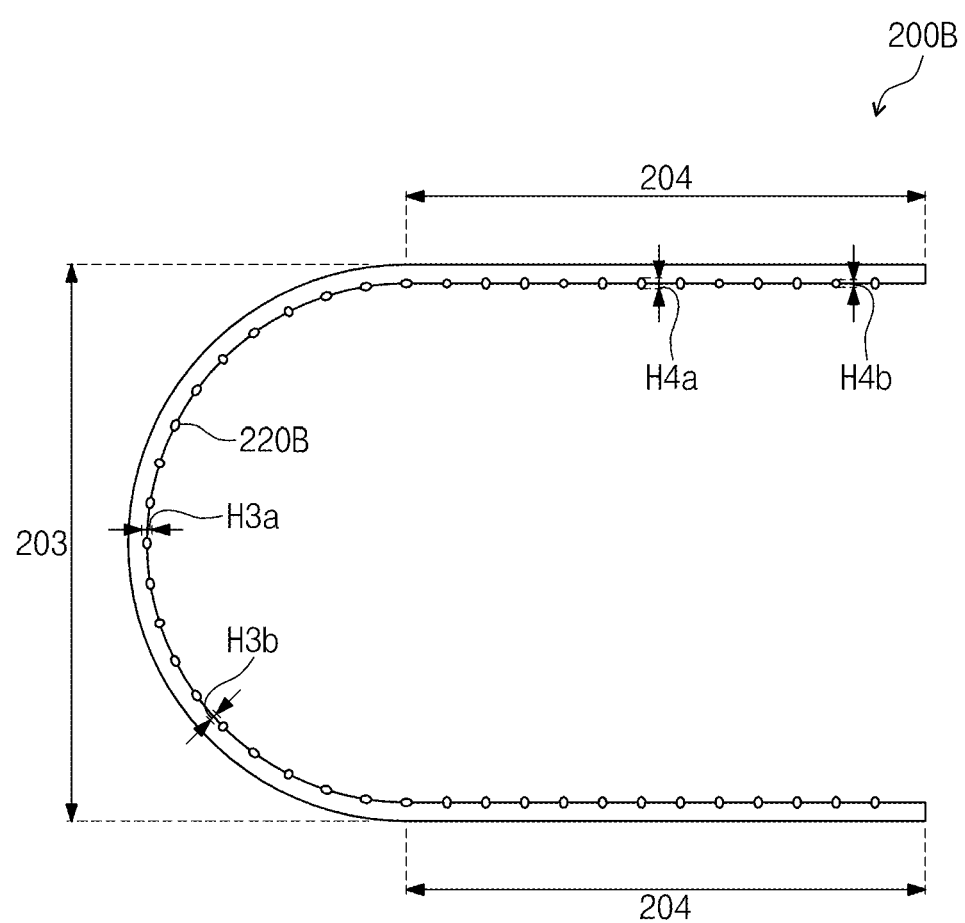
FIG. 11C is a schematic sectional view of a second adhesive member which is in a bent state.
Figure 12A:
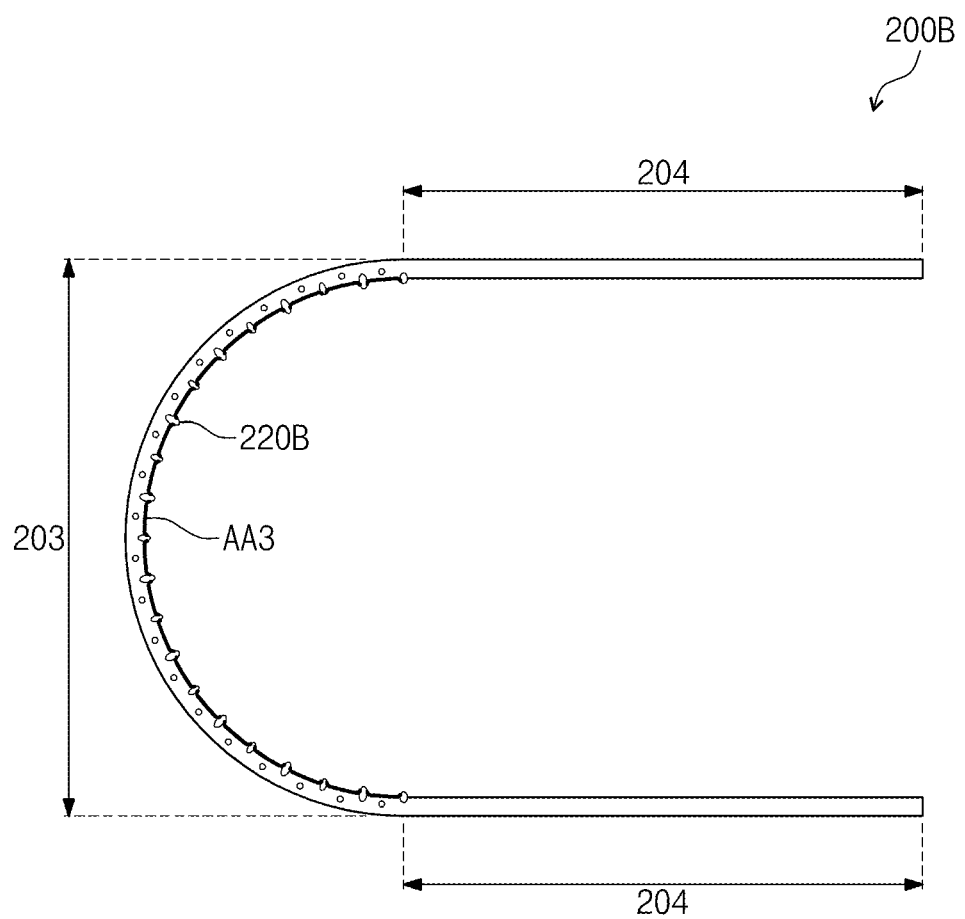
FIG. 12A is a schematic sectional view of a second adhesive member which is in a bent state.
Figure 12B:
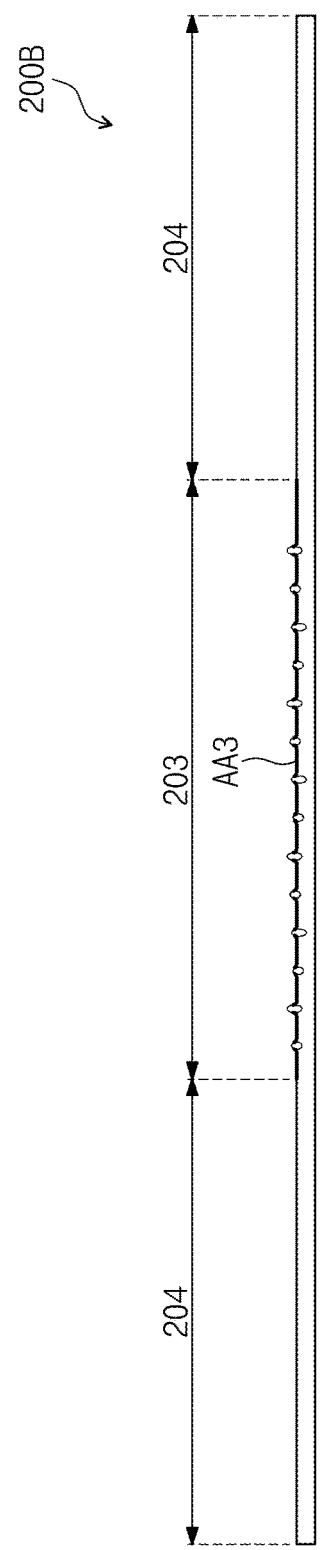
FIG. 12B is a schematic sectional view of a second adhesive member which is in a straightened state.

FIG. 8 is a schematic sectional view taken along the line II-II' in FIG. 7, and FIG. 9 is a schematic perspective view of the flexible display device according to an embodiment of the present disclosure. FIG. 10A is a sectional view illustrating in greater detail a second adhesive member in FIG. 8. FIG. 10B is a sectional view illustrating in greater detail a second adhesive member in FIG. 8. FIG. 11A is a schematic sectional view of a second adhesive member which is in a bent state. FIG. 11B is a schematic sectional view of a second adhesive member which is in a straightened state. FIG. 11C is a schematic sectional view of a second adhesive member which is in a bent state. FIG. 12A is a schematic sectional view of a second adhesive member which is in a bent state. FIG. 12B is a schematic sectional view of a second adhesive member which is in a straightened state.

Figure 12C:
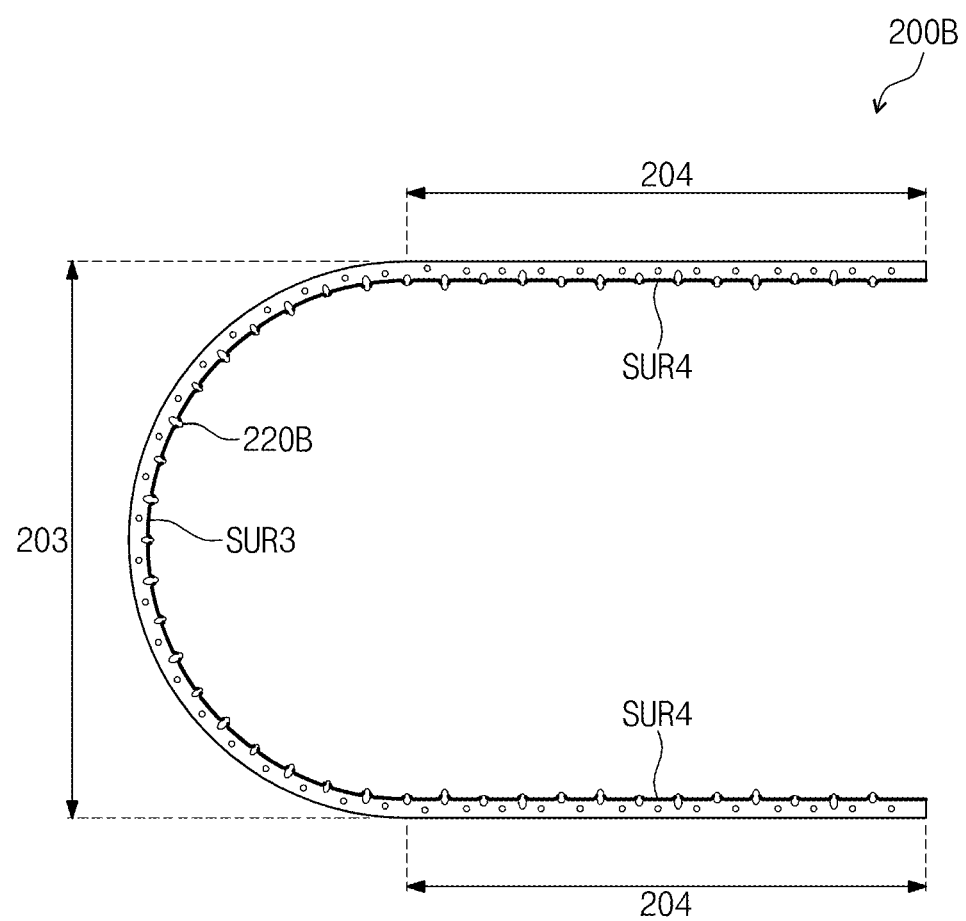
FIG. 12C is a schematic sectional view of a second adhesive member which is in a bent state.

FIG. 12C is a schematic sectional view of a second adhesive member which is in a bent state.

Referring to FIGS. 8 and 9, the second adhesive member 200B includes a third adhesive part 203 and a fourth adhesive part 204. Referring to FIGS. 11A, 11B, 11C, 12A, 12B and 12C, other than figure numbers/reference characters, description given of the first adhesive part 201 may be applied to the third adhesive part 203, while description given of the second adhesive part 202 may be applied to the fourth adhesive part 204.

When the flexible display device 10 according to an embodiment of the present disclosure further includes the second adhesive member 200B and the second flexible member 100B, parts of the first adhesive part 201 and of the third adhesive part 203 may be bent in the first mode. In this case, the second flexible member 100B corresponding to the third adhesive part 203 of the second adhesive member 200B may also be bent therewith.

FIG. 10A is a sectional view illustrating, in greater detail, the second adhesive member in FIG. 8, and FIG. 10B is a sectional view illustrating, in greater detail, the second adhesive member in FIG. 8.

The second adhesive member 200B may include a second adhesive material 210B and a plurality of the second non-adhesive elastic materials 220B. At least one of the second non-adhesive materials 220B may be partially exposed on at least one surface of a top surface 220B-1 or a bottom surface 200B-2 of the second adhesive member 200B.

Other than figure numbers, description given of the first adhesive material 210A may apply to the second adhesive material 210B and, other than figure numbers, description given of the first non-adhesive elastic materials 220A may apply to the second non-adhesive elastic materials 220B.

In a flexible display device according to embodiments of the present disclosure, separation between elements that may otherwise occur during bending may be reduced or minimized.

In a flexible display device according to an embodiment of the present disclosure, a failure rate during repeated bending and unbending may be reduced or minimized.

The above-disclosed subject matter is to be considered illustrative and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A flexible display device comprising:
    a first flexible member comprising a bending part and a non-bending part;
    a window on a top surface or a bottom surface of the first flexible member; and
    a first adhesive member between the first flexible member and the window, and comprising:
        a first adhesive part overlapping the bending part;
        a second adhesive part overlapping the non-bending part;
        a first adhesive material; and
        a plurality of first non-adhesive elastic materials dispersed in the first adhesive material,
    wherein at least one of the first non-adhesive elastic materials is partially exposed on at least one of the top surface or the bottom surface of the first adhesive member.

2. The flexible display device of claim 1, wherein the first adhesive material comprises an adhesive polymer, and
    wherein the first non-adhesive elastic materials comprise elastic microspheres.

3. The flexible display device of claim 1, wherein the flexible display device is configured to operate either in a first mode, in which at least a portion of the bending part and the first adhesive part undergoes bending, or in a second mode, in which the bending part and the first adhesive part are substantially straightened.

4. The flexible display device of claim 3, wherein an average height of the first non-adhesive elastic materials in the first adhesive part in the first mode is lower than an average height of the first non-adhesive elastic materials in the first adhesive part in the second mode, the average height of the first non-adhesive elastic materials being defined as an average value of the maximum height of each of the first non-adhesive elastic materials.

5. The flexible display device of claim 3, wherein an average height of the first non-adhesive elastic materials in the first adhesive part in the first mode is lower than an average height of the first non-adhesive elastic materials in the second adhesive part in the first mode, the average height of the first non-adhesive elastic materials being defined as an average value of the maximum height of each of the first non-adhesive elastic materials.

6. The flexible display device of claim 3, wherein an adhesive strength of the first adhesive part in the first mode is configured to be greater than an adhesive strength of the first adhesive part in the second mode.

7. The flexible display device of claim 3, wherein an adhesive strength per unit area of the first adhesive part in the first mode is greater than an adhesive strength per unit area of the second adhesive part in the first mode.

8. The flexible display device of claim 3, wherein an adhesive area of the first adhesive part in the first mode is greater than an adhesive area of the first adhesive part in the second mode, the adhesive areas comprising an exposed area of the first adhesive material at the top surface or the bottom surface of the first adhesive member.

9. The flexible display device of claim 3, wherein an adhesive area per unit area of the first adhesive part in the first mode is greater than an adhesive area per unit area of the second adhesive part in the first mode, the adhesive areas comprising an area at which the first adhesive material is exposed.

10. The flexible display device of claim 1, wherein the first flexible member comprises at least one of a polarizing plate, a display panel, or a touchscreen panel.

11. The flexible display device of claim 1, further comprising:
    a second flexible member on the top surface or the bottom surface of the first flexible member opposite the window; and
    a second adhesive member between the first flexible member and the second flexible member, and comprising:
        a third adhesive part overlapping the bending part;
        a fourth adhesive part overlapping the non-bending part;
        a second adhesive material; and
        a plurality of second non-adhesive elastic materials dispersed in the second adhesive material,
    wherein at least one of the second non-adhesive elastic materials is partially exposed at a top surface of the second adhesive member or at a bottom surface of the second adhesive member.

12. The flexible display device of claim 11, wherein the second adhesive material comprises an adhesive polymer, and
wherein the second non-adhesive elastic materials comprise elastic microspheres.

13. The flexible display device of claim 11, wherein the flexible display device is configured to operate either in a first mode, in which at least a portion of the bending part, the first adhesive part, and the third adhesive part undergoes bending, or in a second mode in which the bending part, the first adhesive part, and the third adhesive part are substantially straightened.

14. The flexible display device of claim 13, wherein an average height of the second non-adhesive elastic materials in the third adhesive part in the first mode is lower than an average height of the second non-adhesive elastic materials in the third adhesive part in the second mode, the average height of the second non-adhesive elastic materials being defined as an average value of the maximum height of each of the second non-adhesive elastic materials.

15. The flexible display device of claim 13, wherein an average height of the second non-adhesive elastic materials in the third adhesive part in the first mode is lower than an average height of the second non-adhesive elastic materials in the fourth adhesive part in the first mode, the average height of the second non-adhesive elastic materials being defined as an average value of the maximum height of each of the second non-adhesive elastic materials.

16. The flexible display device of claim 13, wherein an adhesive strength of the third adhesive part in the first mode is greater than an adhesive strength of the third adhesive part in the second mode.

17. The flexible display device of claim 13, wherein an adhesive strength per unit area of the third adhesive part in the first mode is greater than an adhesive strength per unit area of the fourth adhesive part in the first mode.

18. The flexible display device of claim 13, wherein an adhesive area of the third adhesive part in the first mode is greater than an adhesive area of the third adhesive part in the second mode, the adhesive areas comprising an exposed area of the second adhesive material at the top surface or the bottom surface of the second adhesive member.

19. The flexible display device of claim 13, wherein an adhesive area per unit area of the third adhesive part in the first mode is greater than an adhesive area per unit area of the fourth adhesive part in the first mode, the adhesive areas comprising areas at which the second adhesive material is exposed.

20. The flexible display device of claim 11, wherein the second flexible member comprises at least one of a polarizing plate or a protective member.

* * * * *